United States Patent [19]

Magnotta

[11] 4,172,163

[45] Oct. 23, 1979

[54] CHEMICALLY-RESISTANT ADHESIVES AND LABELS

[75] Inventor: Frank A. Magnotta, Framingham, Mass.

[73] Assignee: Dennison Manufacturing Company, Framingham, Mass.

[21] Appl. No.: 912,819

[22] Filed: Jun. 5, 1978

[51] Int. Cl.² ............................................. C09J 7/02
[52] U.S. Cl. ..................................... 428/40; 428/343; 428/355; 428/518; 260/33.6 A; 260/33.6 AQ
[58] Field of Search ................. 428/40, 343, 355, 518; 260/33.6 A, 33.6 AQ, 27 BB

[56] References Cited

U.S. PATENT DOCUMENTS

| | | | |
|---|---|---|---|
| 3,956,544 | 5/1976 | Harrington | 428/518 |
| 4,004,058 | 1/1977 | Buros et al. | 428/343 |
| 4,125,665 | 11/1978 | Bemmels et al. | 428/355 |

*Primary Examiner*—Marion E. McCamish
*Assistant Examiner*—E. Rollins Buffalow
*Attorney, Agent, or Firm*—George E. Kersey

[57] ABSTRACT

Chemically-resistant adhesives formed using non-hydrolyzable hard and soft resins. Chemically-resistant labels are provided by using the adhesive to adhere an image-bearing film of polyvinyl chloride to a protective film, and to a carrier. The labels are particularly resistant to acids and have a reduced tendency to shrink or distort when affixed to battery surfaces at elevated temperatures.

12 Claims, No Drawings

CHEMICALLY-RESISTANT ADHESIVES AND LABELS

BACKGROUND OF THE INVENTION

This invention relates to adhesives and labels which are resistant to chemical degradation and are capable of resisting shrinkage and distortion when affixed to surfaces having relatively high temperatures.

Where long life and protection from abrasion and solvent or chemical attack have been desired, it has been customary to employ metal nameplates or labels covered with a protective layer, such as a plastic film or a heat-cured coating of epoxy resin. Labels of this kind are relatively expensive and sometimes difficult to apply. In addition, they often are inadequate in withstanding relatively high temperature exposure and attack by chemicals such as battery acids.

Thus, plastic film and heat-cured overcoatings typically are applied making use of relatively expensive ovens to produce heat which can adversely affect or distort underlying layers. Even where the labels can withstand indirect heating, if they are affixed to a surface which is subject to constant or intermittent heating, the result can be shrinkage, distortion and curling, as well as discoloration.

Accordingly, there is a need for economical pressure-sensitive adhesives and labels which are resistant to chemical degradation and at the same time able to withstand relatively high temperatures. The invention provides for such products by using specifically formulated adhesive-containing resins in a novel arrangement of coating layers.

It is a principal object of the invention to provide adhesives and labels which are resistant to chemical degradation as well as shrinkage and distortion at elevated temperatures. A related object is to provide resistance to battery acids, as well as resistance to shrinkage and distortion at the temperatures where batteries commonly operate. In the case of vehicles, this requires the ability to withstand temperatures close to the boiling point of water.

It is another object of the invention to provide adhesives and labels which have a reduced tendency to discolor or undergo mechanical degradation. A related object is to resist bodystock and laminate degradation of adhesives and labels which are subject to battery acid exposure.

Other objects of the invention will become apparent from the disclosure which follows.

SUMMARY OF THE INVENTION

The integrity of conventional labels is modified, and in some instances totally destroyed, when the labels are subjected to battery acid or elevated temperatures. It has been found that these difficulties may be significantly curtailed by using an adhesive coating non-hydrolyzable hard and soft resins. The adhesive can be applied to a non-plasticized homopolymer polyvinylchloride material to provide a resistant label structure.

Standard labels for batteries typically include a number of distinctive layers. At the outermost position there is normally a protective polyester or poly propylene film that is adhered to an imprinted substrate by an acrylic adhesive. The latter commonly contains acrylic acid, an acrylic acid ester, or an acrylated resin, such as an acrylated epoxy or polyetherpolyisocyanate. The imprinted substrate usually is a plasticized vinyl film on a rubber base. A standard plasticizer is a Phthalate ester, and the rubber base contains a standard resin adhesive, such as that provided by "Stabelite" ester resins. Unfortunately, many of the materials used in conventional battery labels, including inks, are able to withstand adverse effects of battery acid over a limited temperature range, typically up to about only 150° F. There also are adverse secondary effects.

Adhesives and labels in accordance with the present invention demonstrate improved resistance to acid degradation at relatively high temperatures, as high as about 190° F., and the labels are unaccompanied by discoloration and curling. This is achieved by an adhesive composition comprised principally of hard and soft resins. The adhesive is used in conjunction with a non-plasticized unsubstituted pigmented white film of polyvinyl chloride homopolymer. The reasons for the appreciable improvement in the stability of the resulting adhesives and labels is not fully understood, but it has been theorized that there is an interaction in the adhesive and with the homopolymer.

An adhesive in accordance with the invention is formed from a rubber base binder, a non-hydrolyzable hard resin tackifier, a non-hydrolyzable soft resin plasticizer, and a stabilizer.

Only styrene-butadiene copolymers having a Mooney viscosity index of between about 35 and 55 are suitable for the practice of the invention. They are readily available commercially from the Texas U.S. Companying under the tradename "SYMPOL 1011". They are also available from B. F. Goodrich under the tradename "AMERIPOL 1011", and from Goodyear, Inc. under the tradename "PLIOFLEX 1011". It will be appreciated that other similar styrene butadiene copolymers may be employed.

Binders that were evaluated and found unsuitable for the practice of the invention include acrylics, polyvinyl ether adhesives, acrylic adhesives, block polymers, natural rubber and styrene butadiene/natural rubber which are normally employed in rubber base binders.

An appropriate adhesive tackifier for the invention is one which increases adhesive tackiness without being hydrolyzed in the presence of acid. Hard resins having a softening point in the range from about 80° C. to about 100° C. are suitable, such as those available commerically from Reichold Chemicals, Inc. under the tradename "Super Sta-Tac 80". They are pale-colored thermoplastic olefinic resins derived from petroleum and used as tackifiers for natural and synthetic rubbers.

The adhesive plasticizer is also non-hydrolyzable in the presence of acid. In addition, it has a softening point in the range from about 5° C. to about 10° C. and functions in combination with natural or synthetic rubbers and resins. A soft resin plasticizer sold by Hercules, Inc. under the tradename "Piccolyte C-10" has been found to be particularly useful. "Piccolyte C-10" is a proprietary terpene monomer derived from d-Limonene, a terpene hydrocarbon.

Other resin plasticizers such as "Piccolyte A-10" derived from d-pinene, "Piccolyte D-10" derived from dipentene, "Piccolyte S-10" derived from B-pinene and "ADTAC B-10" which is an aliphatic hydrocarbon resin of petroleum origin have been found to be unsuitable. It is believed that the unpolymerized character of "Piccolyte C-10" accounts at least in part for its particular suitability.

The adhesive stabilizer may be any commonly employed compound or combination of compounds. High potency, non-staining antioxidants which are resistant to leaching are particularly desirable. Examples are 2,2'-methylene bis(4 methyl-6-t-butyl phenol), 4,4'butylidene bis, 6-t-butyl-m-cresol, polymerized dihydrotrimethyl quinoline, octylated diphenylamines. A preferable antioxidant is "Wingstay-L", a commerically available polymeric-hindered phenol.

The ratio of certain components is critical in the adhesive. Thus the ratio by weight of binder to tackifier must be on the order of about 1:1 to about 1:1.5. However, the ratio by weight of tackifier to plasticizer may range from about 6:1 to about 15:1, with the stabilizer usually being present at a concentration of about 0.5% to 3% by weight of the binder and tackifier combination. In a preferred embodiment of the invention the binder and tackifier are present in a weight ratio of about 1:1.5, with the tackifier and plasticizer being present in a weight ratio of about 12:1. The stabilizer is preferably a concentration of about 1% by weight of the binder and tackifier combination.

The concentration of solvent for the adhesive is not critical nor is the type of solvent. Generally, any commonly employed aromatic or aliphatic solvent is appropriate.

Antioxidants, fillers and other additives, preferably acid resistant, may also be used.

The carrier for the image-bearable film is provided by a substrate in the form of a release sheet or the surface to which the label is adhered. The release sheet, which may be of the type conventionally used for pressure-sensitive label sheet stock, with a silicone-coated paper release sheet being preferred.

Labels in accordance with the invention are produced by applying pressure-sensitive adhesive, formulated as described above, in solution as a continuous web to an imprintable hompolymer film and dried. Thereafter, a release sheet is applied to the film to form a pressure-sensitive adhesive laminate.

The laminated stock is then slit into proper widths for printing on a press. Although the label imprint may be made upon plasticized vinyl film, and certain non-plasticized vinyls with any commonly employed ink, the acid resistance of the resultant label is not as great as that achieved with polyvinyl chloride homopolymer. It also is preferable to use commerically available acid-resistant inks.

After imprinting, the laminate is joined to a protective polypropylene balanced biaxially oriented film, usually ranging in thickness from about 0.5 mils to about 5.0 mils, by adhesive of the kind described above. The composite material is then cut into individual, spaced labels on the release sheet.

Usually the skeleton between and around the individual labels is stripped off the uncut release sheet to leave a plurality of spaced labels mounted on the release sheet strip, usually in one or more rows. In some cases, the release sheet may be perforated and feed holes punched into the release sheet on the labels themselves. These operations, including the stripping step, are carried out at high speed.

DETAILED DESCRIPTION

For a clearer understanding of the present invention, reference is made to the following examples which are directed mainly to the preparation of the adhesive.

EXAMPLE I

An acid-resistant adhesive was prepared from the following ingredients:

"Synpol 1011"—a rubber base binder
"Super Sta-Tac 80"—a tackifier with a softening point in the range from about 80° C. to about 100° C.
"Piccolyte C-10"—a plasticizer with a softening point in the range from about 5° C. to about 10° C.
"Wingstay L"—a stabilizer
Heptane and Toluene—solvents The binder had a Mooney viscosity in the range from about 35 to 55 and was employed with the tackifier in a weight ratio in the range from about 1:1 to about 1:1.5. The plasticizer had a weight ratio in the range from about 1:6 to about 1:15 with the tackifier; and the stabilizer had a concentration in the range from about 0.5 to 3% by weight of the combined binder and tackifier.

The "Wingstay L" stabilizer was dissolved in about 8 lbs. of toluene and combined with an additional 32 lbs. of toluene and 125 lbs. of heptane under constant stirring conditions in a 55 gallon drum. The "Synpol" rubber base binder was then added and the entire mixture was stirred for about 6 hours until the binder went into solution. The "Super Sta-Tac" tackifier was next added to the stabilizer/binder solution and stirred for about 1 hour until complete dissolution of the tackifier was achieved.

The "Piccolyte" stabilizer was combined in a separate container with an amount of toluene sufficient to allow the plasticizer to go into solution. This was then added to the homogeneous mixture of stabilizer, binder and tackifier and the entire composition stirred for about ½ hour.

The resultant adhesive composition was found to be pressuresensitive with a plasticity of about 1.80, a solids concentration of about 35% and a viscosity of between about 2,000 to 3,000 cps.

EXAMPLE II

The adhesive composition of Example I was used to form a test label. The label had an outer polypropylene layer of about 1 mil. thickness, followed in succession by an adhesive layer, an image layer, a polyvinyl chloride homopolymer layer of about 4 mil thickness, and another adhesive layer. The resultant label was applied to a substrate and evaluated against a conventional pressure-sensitive battery label containing an acrylic adhesive with test label proving unexpectedly superior.

Specifically, when the labels, each measuring about 1"×2", were affixed to a polypropylene battery case with a surface temperature of about 190° F. for approximately 24 hours, the test label demonstrated absolutely no evidence of discoloration, curl, or acid burn. However, the conventional label was blackened around its entire outer rectangular extremity by acid degradation over more than 40% of its surface after only 24 hours. In addition, significant curling and separation of the conventional label from the surface of the battery itself was noted, along with appreciable hydrolysis of the imprint.

EXAMPLE III

The method of preparation and evaluation of Examples I and II were employed using the following ingredients:

"Synpol 1011" binder—Mooney viscosity of 40-45
Binder/"Super Sta-Tac 80" tackifier ratio—1:1.5

Tackifier/"Piccolyte C-10" plasticizer ratio—12:1
"Wingstay L" stabilizer—1% concentration After evaluating the test labels under the identical test conditions of Example II, the same superior stability against degradation, discoloration and curl was noted as compared with conventional battery labels.

The foregoing description and examples are given by way of illustration and are not intended to limit the invention which extends to all equivalents and is defined in the following claims.

What is claimed is:

1. An acid-resistant label comprising a non-plasticized film of a polyvinyl chloride homopolymer secured at one side to a polypropylene balanced biaxially oriented film and at the opposite side to a substrate by an adhesive, said adhesive comprising a styrene butadiene compolymer binder having a Mooney viscosity index between about 35 and 55, a non-hydrolyzable hard resin tackifier having a softening point in the range from about 80° C. to about 100° C., a non-hydrolyzable soft resin plasticizer having a softening point range of about 5° C. to about 10° C., and a stabilizer, said binder and tackifier being present in a weight ratio in the range from about 1:1 to about 1:1.5, said tackifier and plasticizer being present in a weight ratio in the range from about 6:1 to about 15:1, and said stabilizer being present in a concentration in the range from about 0.5% to about 3% by weight of the binder and tackifier combined.

2. The label of claim 1 wherein the binder and tackifier are present in a weight ratio of about 1:1.5.

3. The label of claim 2 wherein the tackifier and plasticizer are present in a weight ratio of about 12:1.

4. The label of claim 3 wherein the stabilizer is present in a concentration of about 1%.

5. The label of claim 5 wherein the Mooney viscosity is from about 40 to about 45.

6. The label of claim 1 wherein the hard resin is a pale-colored thermoplastic olefinic resin petroleum derivative.

7. The label of claim 1 wherein the soft resin is a terpene monomer derived from d-Limonene.

8. The label of claim 1 wherein the stabilizer is a high-potency, non-staining antioxidant.

9. The label of claim 8 wherein the stabilizer is a polymeric-hindered phenol.

10. The label of claim 1 wherein an image layer is present on the polyvinyl chloride homopolymer.

11. The label according to claim 10 wherein the image layer is formed by acid-resistant inks.

12. The label of claim 1 wherein the substrate is paper.

* * * * *